United States Patent [19]

Kassai

[11] 4,216,974
[45] Aug. 12, 1980

[54] COLLAPSIBLE BABY CARRIAGE

[75] Inventor: Kenzo Kassai, Higashishimizu, Japan

[73] Assignee: Kassai Kabushikikaisha, Osaka, Japan

[21] Appl. No.: 901,341

[22] Filed: May 1, 1978

[30] Foreign Application Priority Data

| Jun. 15, 1977 | [JP] | Japan | 52-71460 |
| Dec. 22, 1977 | [JP] | Japan | 52-155189 |
| Jan. 7, 1978 | [JP] | Japan | 53-596[U] |
| Jan. 27, 1978 | [JP] | Japan | 53-8442 |
| Jan. 27, 1978 | [JP] | Japan | 53-8443 |
| Jan. 27, 1978 | [JP] | Japan | 53-9151[U] |

[51] Int. Cl.² .................................. B62B 7/08
[52] U.S. Cl. ........................... 280/42; 280/650
[58] Field of Search .......... 280/42, 641, 642, 644, 280/647, 650, 657, 658, 39

[56] References Cited
U.S. PATENT DOCUMENTS 4,049,292  9/1977  Perego ........................ 280/642
4,077,641  3/1978  Perego ........................ 280/42

Primary Examiner—Robert R. Song
Attorney, Agent, or Firm—W. G. Fasse; D. F. Gould

[57] ABSTRACT

A collapsible baby carriage comprising a pair of front legs, a pair of rear legs, a pair of push rods, and a plurality of connecting links bendably installed between each pair of front legs, rear legs and push rods. The bending movements of these pluralities of connecting links are operatively associated with each other by link mechanisms. At least one of these pluralities of connecting links are upwardly bendable, so that when the bendable section of this plurality of upwardly bendable connecting links is lifted to allow the whole baby carriage to hang downwardly, the weight of the baby carriage acts to upwardly bend the connecting links, in operative association of which upward bending the other pluralities of connecting links are also bent, reducing the distances between the pair of front legs, the pair of rear legs and the pair of push rods, respectively, whereby the baby carriage is collapsed.

10 Claims, 33 Drawing Figures

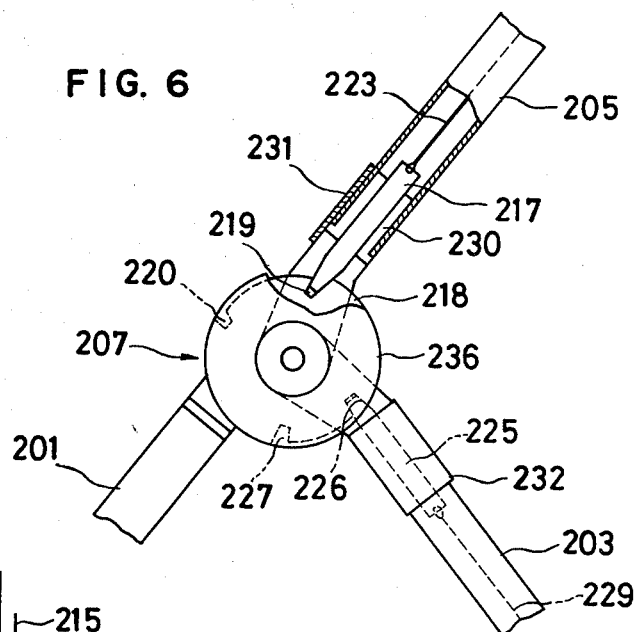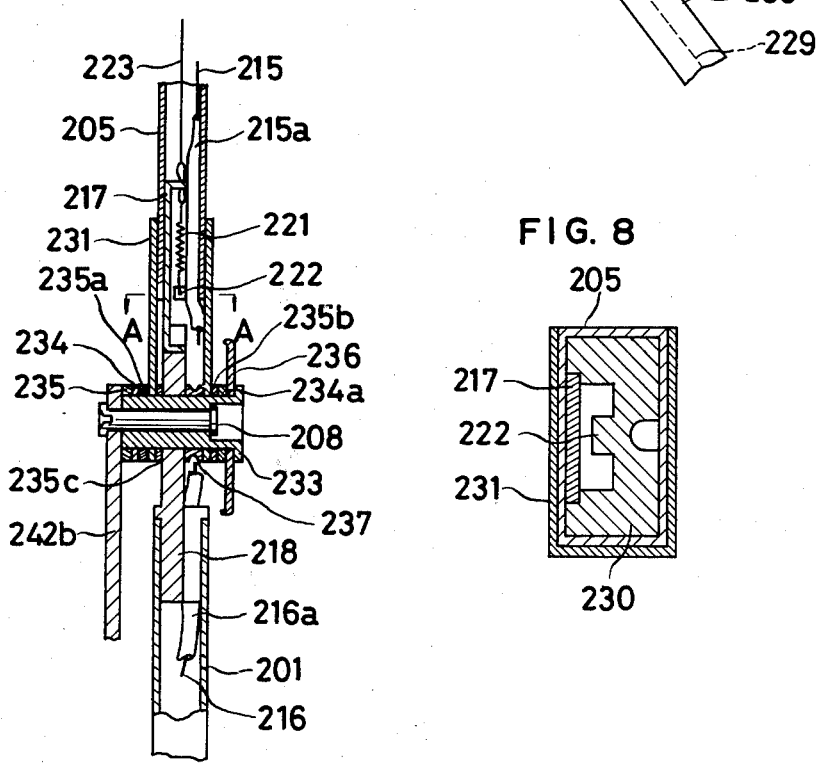

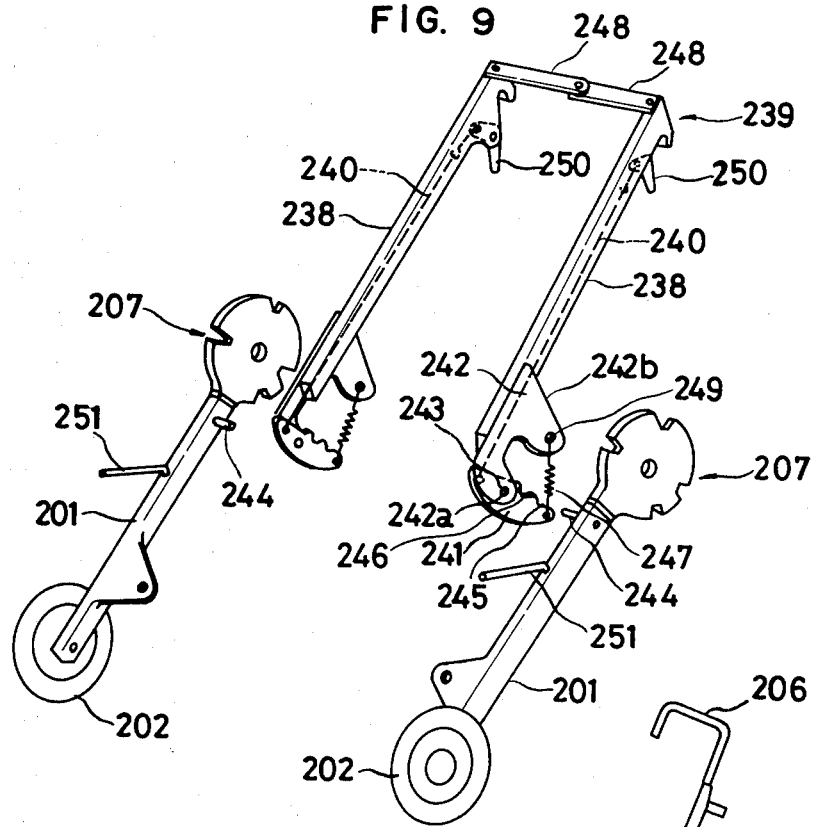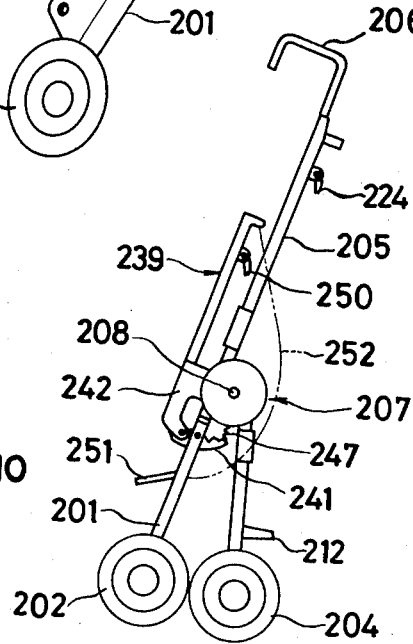

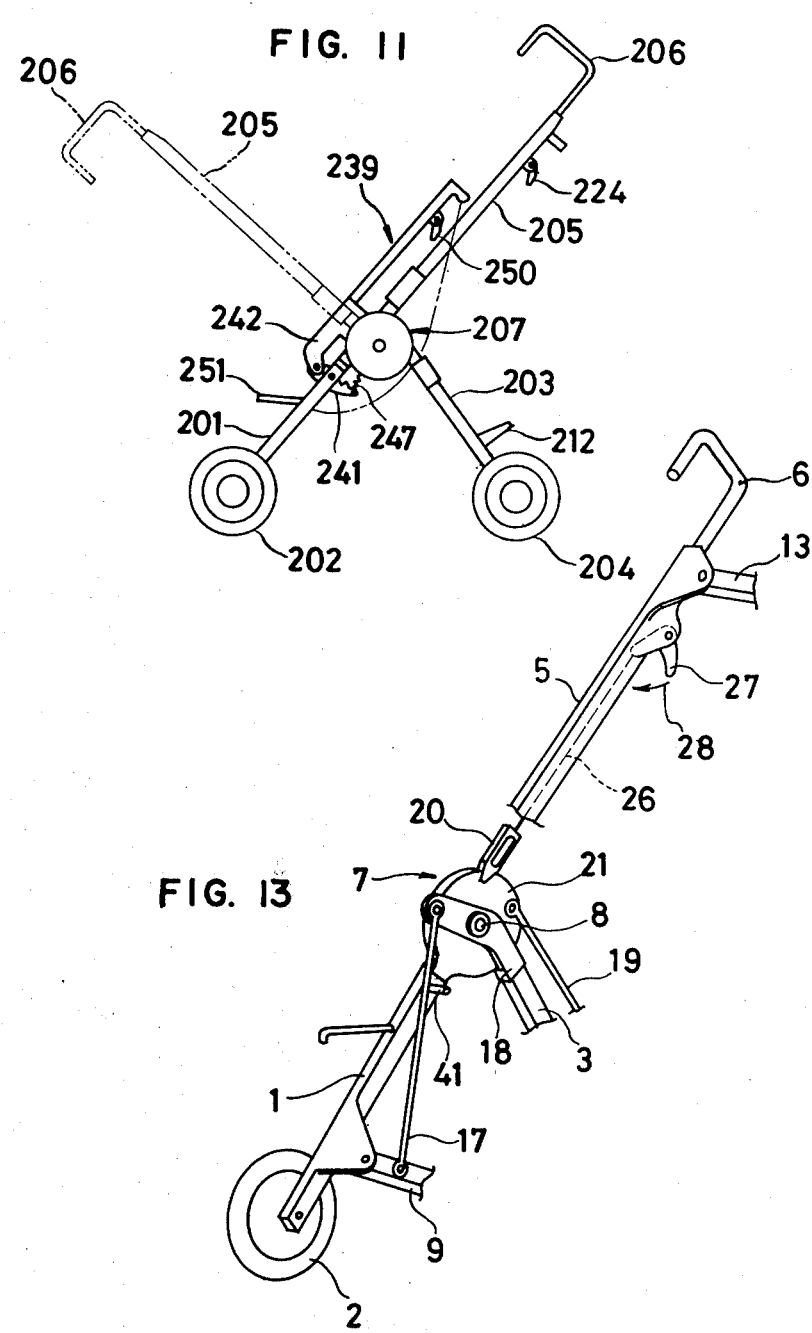

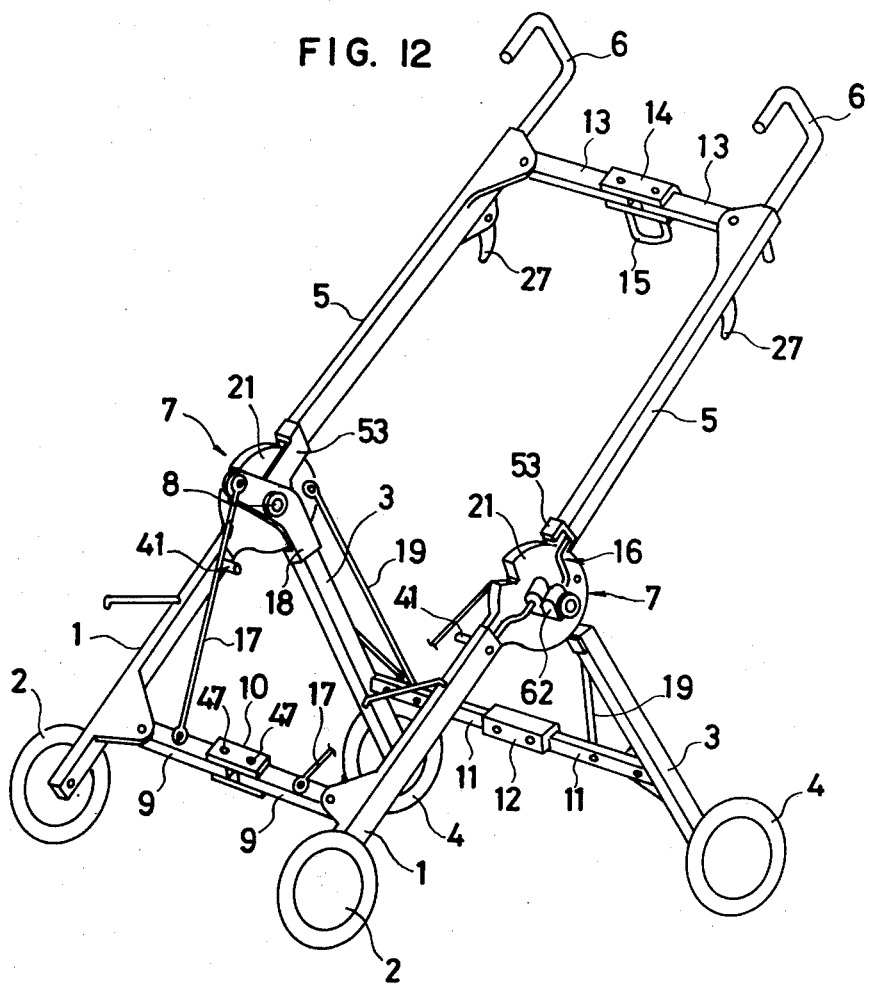

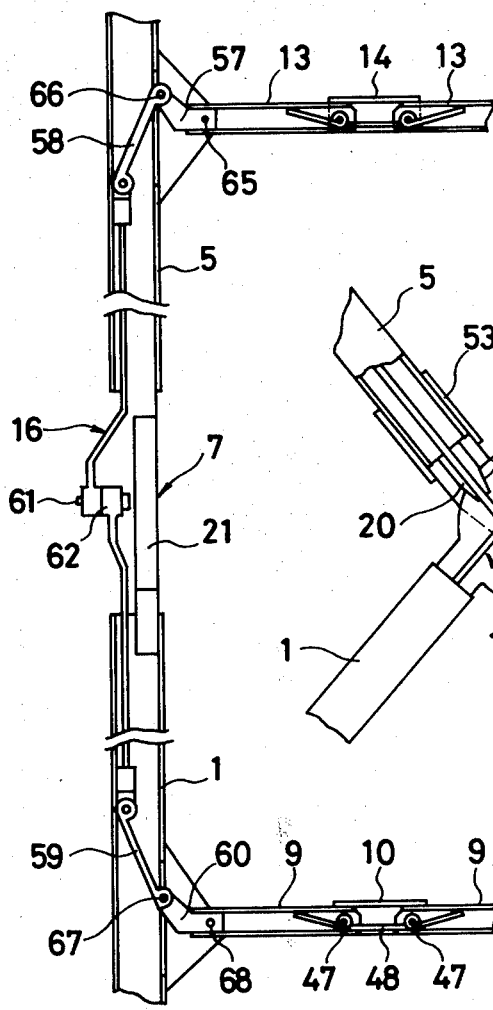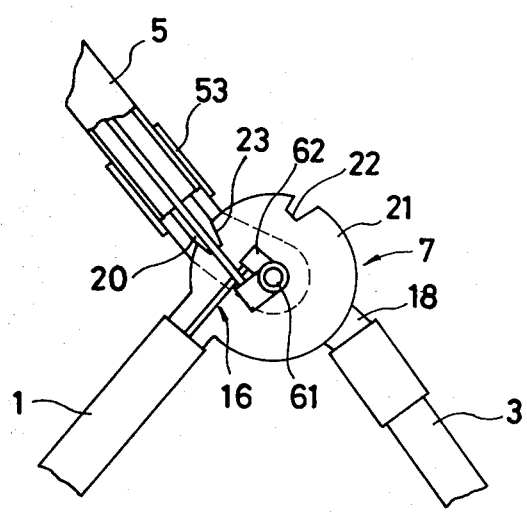

COLLAPSIBLE BABY CARRIAGE

BACKGROUND OF THE INVENTION

1. Field of the Invention

This invention relates to a collapsible baby carriage, and more particularly it relates to improvements in the collapsing mechanism thereof.

2. Description of the Prior Art

Generally, a collapsible baby carriage is very convenient in connection with the use of transport facilities and has been widely used. Among the performance requirements of the collapsible baby carriage are the following:

(1) Safety.

(2) The posture of the baby resting in the baby carriage should be satisfactory from a medical viewpoint.

(3) The collapsing operation should be easy.

(4) The carriage should be light in weight and handy to carry.

(5) It should be of simple construction and of (6) sufficient strength and durability.

(7) It should provide a reclining function as well as (8) two selectable push modes, one, in which the person who pushes the baby carriage pushes it while facing the back of the baby in the carriage, and the other in which said person and the baby are face to face.

(9) The collapsing handle should be within easy reach.

(10) The opening and/or closing of the legs should require only a single manual action.

SUMMARY OF THE INVENTION

This invention is intended to provide a baby carriage which is capable of meeting these requirements of a collapsible baby carriage.

In brief, this invention relates to a collapsible baby carriage comprising a pair of parallelly extending front legs, a pair of parallelly extending rear legs crossing said front legs, a pair of parallelly extending push rods adapted to be pushed with both hands and substantially fixed to said front and rear legs so that said manual pushing may be transmitted to said front and rear legs. A plurality of sets of connecting links are bendably installed between the pair of front legs, rear legs and push rods, respectively. The bending movements of said plurality of sets of connecting links are operatively associated with each other by a link mechanism. The synchronous bending and unbending of the plurality of sets of connecting links results in the closing and opening of the baby carriage. In the leg-closed state of this baby carriage, the distances between the pair of front legs, the pair of rear legs and the pair of push rods, respectively, are the shortest, thereby presenting the elongatedly collapsed form of the baby carriage. In a preferred embodiment of the invention, the bending operation of the plurality of sets of connecting links is achieved by a link mechanism including wires. In another preferred embodiment of the invention, the bending operation of the plurality of sets of connecting links is achieved by a link mechanism including rods. In a further preferred embodiment of the invention, the push rods are pivotally connected to the front legs, whereby the back-facing and face-to-face push modes with respect to the baby can be realized. In another preferred embodiment of the invention, the back of the hammock may be adjusted to a desired reclined position. In still a further embodiment of the invention, one of the plurality of connecting links functions as an operating part and this operating connecting link is provided with a lever part which assists in the bending operation of this connecting link, so that as soon as the lever part is lifted to allow the baby carriage to hang downwardly, the weight of the baby carriage acts to effect the closing or opening of the legs.

Accordingly, a principal object of the present invention is to provide a collapsible baby carriage adapted to be collapsed into a compact or, more specifically, elongated form.

Another object of the invention is to provide a collapsible baby carriage wherein the collapsing operation is easy.

A further object of the invention is to provide a collapsible baby carriage which is capable of selectively providing the back-facing and face-to-face push modes with respect to the baby rested therein.

These and other objects and features of the invention will become more apparent from the following detailed description taken in connection with the accompanying drawings.

BRIEF DESCRIPTION OF THE DRAWINGS

FIG. 6 is an enlarged side view of the arrangement related to a pivotal mount and other parts shown in FIG. 1;

FIG. 7 is an enlarged longitudinal section, showing the arrangement around the pivotal mount;

FIG. 8 is an enlarged section taken along the line A—A of FIG. 7;

FIG. 9 is an exploded perspective view, showing the back of the hammock and the front legs;

FIG. 10 is a side view of the baby carriage of FIG. 1, shown in its leg-closed state;

FIG. 11 is a side view, in the leg-opened state, illustrating the back-facing and face-to-face push modes achieved in the baby carriage shown in FIG. 1;

FIG. 12 is a perspective view of another embodiment of the invention shown in its leg-opened state, with the arrangement related to the hammock and other parts omitted from the illustration;

FIG. 13 is a partial, perspective view, in the leg-opened state, illustrating the arrangement for selectively providing the back-facing and face-to-face push modes;

FIG. 19 is an enlarged side view, partly broken away, showing a state different from that shown in FIG. 18;

FIG. 20 is a longitudinal section, partly broken away, showing an interlocking mechanism extending from a push rod connecting link to a front leg connecting link of FIG. 12;

DESCRIPTION OF THE PREFERRED EMBODIMENTS

Figure 1:
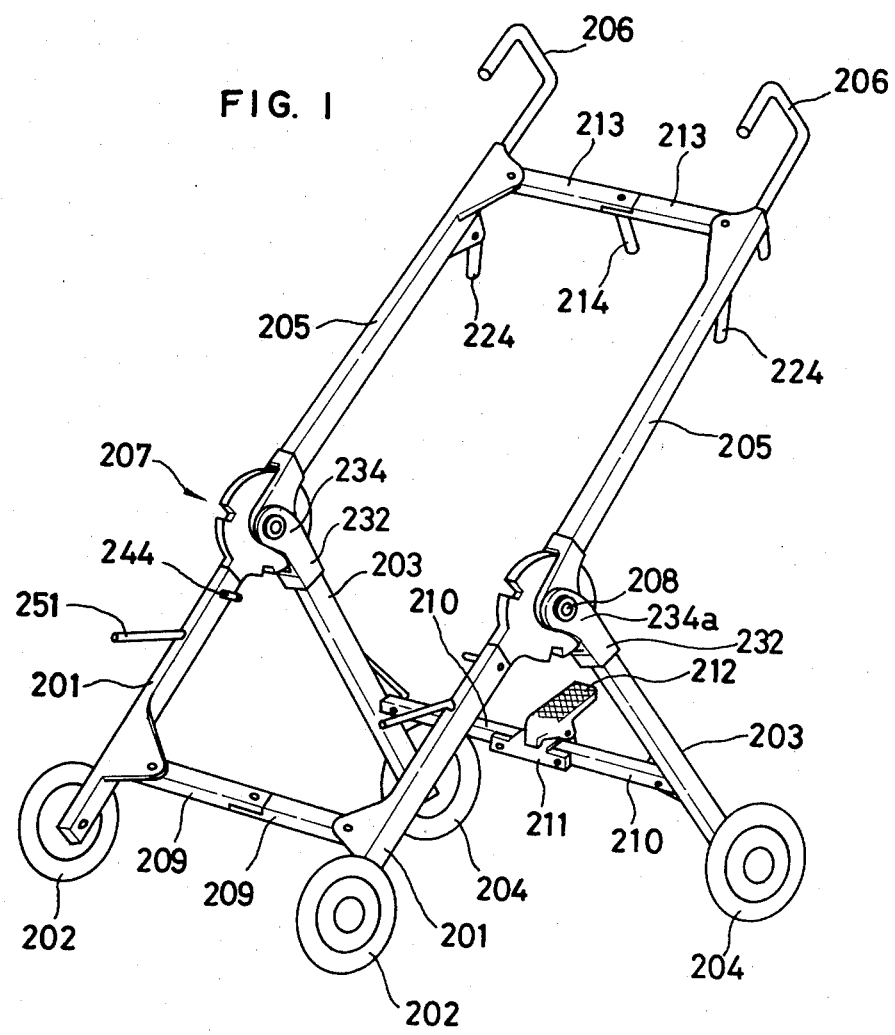
FIG. 1 is a perspective view of an embodiment of the invention shown in its leg-opened state, with the arrangement related to the hammock and other parts omitted from the illustration.
Figure 2:
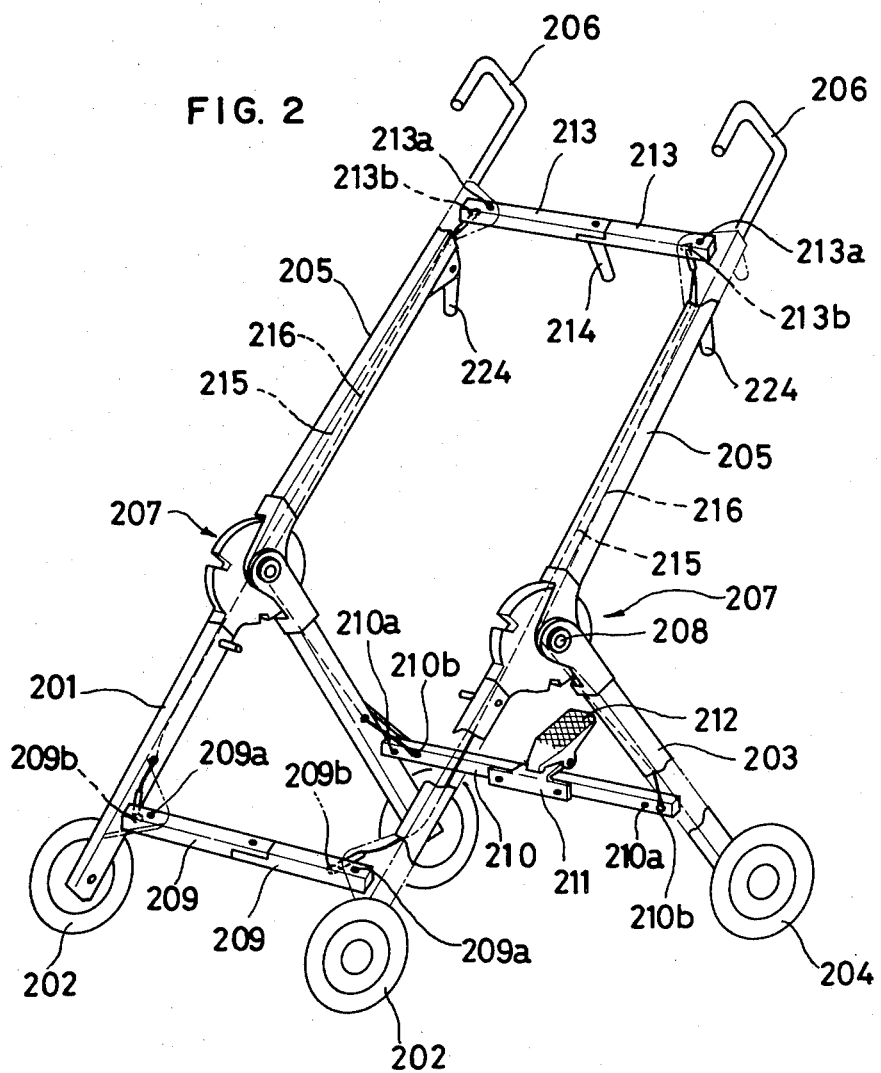
FIG. 2 is a partial, perspective view, in the leg-opened state, illustrating the disposition of wires serving for the collapsing operation of the baby carriage shown in FIG. 1.
Figure 4:
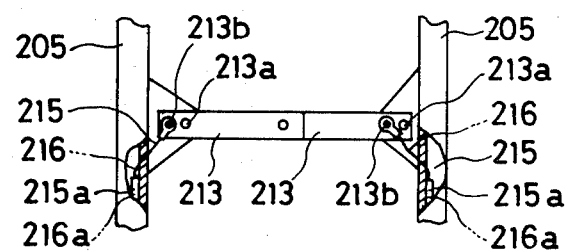
FIG. 4 is a front view of the principal portion of FIG. 2.
Figure 5:
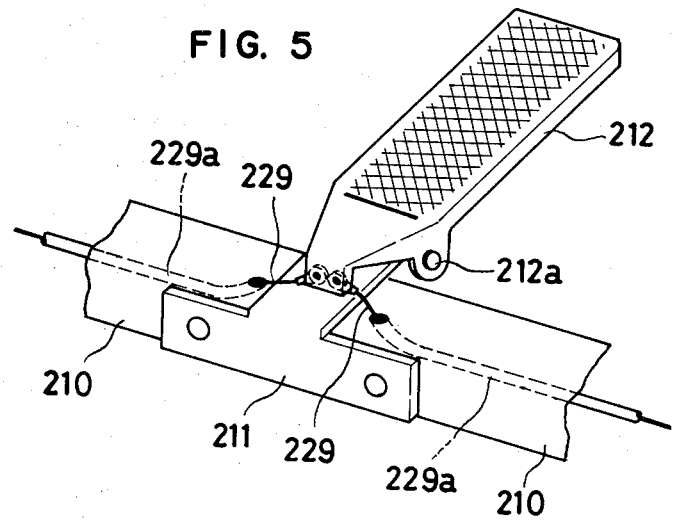
FIG. 5 is an enlarged perspective view of the principal portion of FIG. 3.

Referring to FIGS. 1 and 2, front legs 201 have front wheels 202 mounted on their lower ends while rear legs 203 have rear wheels 204 mounted on their lower ends. Push rods 205 have handles 206 provided at their upper ends. A pivotal mount 207 is fixed to each front leg 201 and pivotally supports each rear leg 203 and push rod 205 at a single pivot point by a pivot pin 208. Front leg connecting links 209 are installed between the front legs 201 and interconnected so as to be upwardly bendable. Rear leg connecting links 210 are connected between the rear legs 203 so as to be downwardly bendable. A coupling 211 is provided for connecting and pivotally supporting the rear leg connecting links 210. A foot pedal 212 is pivotally connected to the coupling 211 by a pin 212a (FIG. 5), and when stepped on by the foot, it acts to downwardly bend the rear leg connecting links 210. Push rod connecting links 213 are connected between the push rods 205 so as to be upwardly bendable. Operating grips 214 extend from pins which pivotally support the push rod connecting links 213. A first wire 215 is inserted in each push rod 213 and front leg 201 and interconnects the associated push rod connecting link 213 and front leg connecting link 209. One first wire 215, as best seen in FIGS. 2 and 4, is tied between the right-hand side push rod connecting link 213 and front leg connecting link 209 by pins 213b and 209b inwardly of pivot pins 213a and 209a by which said connecting links 213 and 209 are connected to the associated push rod 205 and front leg 201, respectively, while the other first wire is tied between the left-hand side push rod connecting link 213 and front leg connecting link 209 by pins 213 outwardly of pivot pins 231a and 209a by which said connecting links 213 and 209 are connected to the associated push rod 205 and front 201, respectively. A second wire 216 is inserted in each push rod 205 and rear leg 203 and interconnects the associated push rod connecting link 213 and rear leg connecting link 210. One second wire 216, as best seen in FIGS. 2 and 4, is tied between the right-hand side push rod connecting link 213 and rear leg connecting link 210 by pins 213b and 210b inwardly of a pivot pin 213a for the push rod 205 and outwardly of a pivot pin 210a for the rear leg 203, while the other second wire 216 is tied between the left-hand side push rod connecting link 213 and rear leg connecting link 210 by pins 213b and 210b outwardly of a pivot pin 213a for the push rod 205 and inwardly of pivot pin 210a for the rear leg 203. Such reversal of the right and left wire attaching positions is intended to facilitate both the opening and closing operations of the baby carriage.

While the first and second wires 215 and 216 have been shown simply in broken lines, actually, inside the push rods 205, front legs 201 and rear legs 203 they are sheathed in wire tubes 215a and 216a, respectively.

Figure 3:
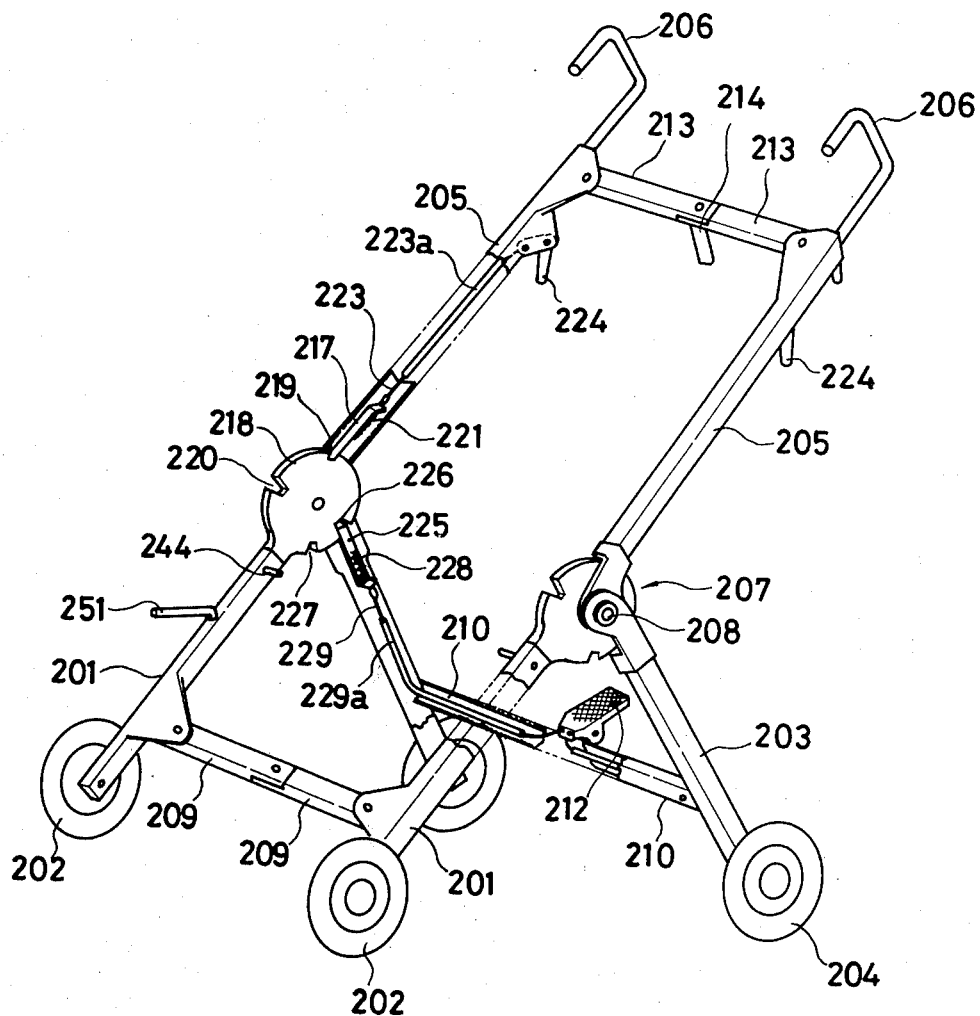
FIG. 3 is a partial, perspective view, in the leg-opened state, illustrating the arrangement for selectively providing the back-facing and face-to-face push modes and the arrangement for opening and closing the rear legs in the baby carriage shown in FIG. 1.

In FIG. 3, a wedge-like member 217 is adapted to selectively engage a first notch 219 or a second notch 220 in a stop plate 218 included in each pivotal mount 207. A spring 221 is installed between a fixed projection 222 (FIG. 7) inside each pivotal mount 207 and the upper end of the wedge-like member 217 and downwardly urges the latter to engage the notch 219 or 220 of the stop plate 218. A third wire 223 is tied to the associated wedge-like member 217 and inserted in the push rod 205. A wire tube 223a sheathes the third wire 223. An operating piece 224 is pivotally attached to the back of each push rod 205 and has the upper end of the associated wire 223 tied thereto. Therefore, when the operating pieces 224 are pulled up, the engagement between the wedge-like members 217 and the first or second notches 219 or 220 of the stop plates 218 is destroyed, thereby permitting the push rods 205 to be turned with respect to the front legs 201.

Wedge-like members 225 for controlling the turning of the rear legs 203 with respect to the front legs 201 are adapted to engage third or fourth notches 226 or 227 in the stop plates 218. Thus, a spring 228 is provided between a fixed projection (not shown) inside each pivotal mount 207 and the lower end of the associated wedge-like member 225 and upwardly urges the latter to engage the notch 226 or 227 of the stop plate 218. A fourth wire 229 is tied to each wedge-like member 225 and inserted in the associated rear leg 203 and rear leg connecting link 210. A wire tube 229a sheathes each fourth wire 229. The front ends of the wires 229 are tied to the front end of the foot pedal 212, so that when the pedal 212 is stepped on by the foot, the wedge-like members 225 are pulled down, removing the engagement between the wedge-like members 225 and the third or fourth notches 226 or 227 of the stop plates 218, thereby permitting the rear legs 203 to be turned with respect to the front legs 201.

Referring to FIGS. 6 through 8 illustrating the details of such pivotal mount 207, a guide 230 serves to guide the wedge-like member 217 inside the push rod 205 as said wedge-like member is moved toward the stop plate 218. A coupling 231 pivotally connects the push rod 205 to the pivotal mount 207, while a coupling 232 pivotally connects the rear leg 203 to the pivotal mount 207. Mounted on a pivotal mount body 233 which is cylindrical are, from right to left as viewed in FIG. 7, a cover 236 for the pivotal mount, one side plate 234a of the coupling 232, one side plate of the coupling 231 disposed adjacent a washer 235b, an outer rope guide 237 which guides the first wire 215 or second wire 216, the stop plate 218 fixed to the front leg 201, the other side plate of the coupling 231 adjacent a washer 235c, the other side plate 234 of the coupling 232 adjacent a washer 235a, and an upper projection 242b on an attaching plate 242 on a hammock holding frame 239 to be later described, all these being clamped by the pivot pin 208. In this way, the pivotal mount 207 pivotally supports the rear leg 203, push rod 205 and hammock holding frame 239 at a single pivot point with respect to the front leg 201.

In FIG. 9 illustrating the holding frame 239 for holding the hammock, the hammock holding frame 239 comprises side rods 238 and connecting links 248 installed between said side rods 238 at their upper ends. The attaching plate 242 is fixed to the lower end of each side rod 238 and is formed with an opening 249 for receiving the pivot pin 208 of the pivotal mount 207. The hammock holding frame 239 is pivotally supported with respect to the front legs 201 as in the case of the push rods 205 and rear legs 203.

Fifth wires 240 are inserted in the side rode 238. Operating pieces 250 are pivotally supported on the backs of the side rods 238 and have the front ends of the wires 240 tied thereto. Reclining members 241 are pivotally supported at lower projections 242a on the attaching plates 242 by pivot pins 243. The lower ends of the wires 240 are tied to one of the respective ends of the members 241. The members 241 have two engaging recesses 245 and 246 for engagement with engaging pins 244 projecting from the inner sides of the front legs 201 and are upwardly urged by springs 247 stretched between the other ends of said members 241 and the projections 242b on the attaching plates 242. Therefore, the arrangement is such that the engaging pins 244 engage the engaging recesses 245 or 246, thus holding the hammock holding frame 239 in a controlled or adjusted position. Further, the sheet which constitutes the hammock 252 (FIG. 10) is fixedly wrapped around the hammock holding frame 239 and bars 251 forwardly projecting from the front legs 201.

The opening and closing operations of this baby carriage will now be described.

In the leg-opened state shown in FIGS. 1 through 3, the front leg connecting links 209, rear leg connecting links 210 and push rod connecting links 213 are held straight between the front legs 201, rear legs 203 and push rods 205, respectively, and the wedge-like members 217 are engaged with the first notches 219 of the stop plates 218 to position the push rods 215 for the back-fronting push mode while the wedge-like members 225 are engaged with the third notches 226 of the stop plates 218 to position the rear legs 203 opened with respect to the front legs 201, so that the baby carriage is maintained in this leg-opened state.

In order to bring the baby carriage into the leg-closed state, one foot is placed on the foot pedal 212 to depress it while one hand grasps the operating grip 214 to raise it, the stepping on of the pedal resulting in the wedge-like members 225 being pulled down through the wires 229 to be disengaged from the third notches 218 of the stop plates 218, thereby making the rear legs 203 rotatable with respect to the front legs 201. Concurrently therewith, the raising of the operating grip 214 results in the push rod connecting links 213 being upwardly folded in two, causing the first wires 215 to turn the front leg connecting links 209 into an upwardly folded state and the second wires 216 to turn the rear leg connecting links 210 into a downwardly folded state. The rear leg connecting links 210 also tend to be turned and downwardly folded when the foot pedal 212 is stepped on. In this connection, it is to be noted that since the rear legs 203 have been made rotatable with respect to the front legs 201, the rear leg connecting links 210 are turned and downwardly folded in two while the front legs 201 are turned toward the front legs 201, so that eventually the baby carriage is collapsed into an elongated form, as shown in FIG. 10. The leg opening operation is instantaneously carried out by the cooperation of the first and second wires 215 and 216 which actuate the connecting links 213, 209 and 210 for the push rods 205, front legs 201 and rear legs 203.

When the foot is removed from the foot pedal 212, the wedge-like members 225 are upwardly urged into engagement with the fourth notches 227 of the stop plates 218, whereby the baby carriage is held in the leg-closed state.

In this leg-closed state, the baby carriage stands on the front and rear wheels 202 and 204.

In this way, the baby carriage can be easily collapsed only by one hand and one foot; it is not absolutely necessary to hold the handles 206 of the push rods 205 of the baby carriage.

When it is desired to bring the baby carriage into the leg-opened state from this leg-closed state, this may be achieved by lightly stepping on the foot pedal 212 to pull down the wedge-like members 225 through the wires 229 and then pulling down the operating grip 214 by the hand, whereupon the push rod connecting links 213 are downwardly turned to assume a straight position between the push rods 205, thereby causing the first and second wires 215 and 216 to turn the front leg connecting links 209 downwardly and rear leg connecting links 210 upwardly, respectively, straightening the connecting links 209 and 210 between the front and legs 201 rear legs 203, respectively, so that eventually the baby carriage assumes the leg-opened state shown in FIGS. 1 through 3. When the foot is removed from the foot pedal 212, the wedge-like members 225 engage the third notches 226 of the stop plates 218, thereby holding the baby carriage in this leg-opened state.

In addition, in the opening and closing operation of the baby carriage, the hammock holding frame 239 is opened and closed along with the baby carriage proper by the turning of the connecting links 248 irrespective of whether it is in the normal reclined position or a more inclined position to be later described.

The operation of switching the push rods of the baby carriage from its back-facing to its face-to-face pushing position will now be described.

As shown in FIGS. 1 through 3, when the push rods 205 are in the back-facing pushing position, the wedge-like members 217 are engaged with the first notches 219 of the stop plates 218 of the pivotal mounts 207 to fix the push rods 205 in this position. In this state, when the operating pieces 224 pivotally supported on the backs of the push rods 205 are pulled up, the wedge-like members 217 are pulled up through the wires 223, so that the engagement between the wedge-like members 217 and the first notches 219 is destroyed. When the push rods 205 are forwardly turned to a suitable position and then the hands are removed from the operating pieces 224, the wedge-like members 217 are downwardly urged by the springs 221 into engagement with the second notches 220 of the stop plates 218, so that the push rods 205 are fixed in the face-to-face pushing position.

In order to bring the push rods 205 back to the face-to-face push position, the operation described above may be reversed. In this way, the switching operation on the push rods 205 can be performed simply by operating the operating pieces 224 which are within easy reach.

The reclining operation of the hammock of the baby carriage will now be described.

Suppose that the hammock holding frame 239 is in the normal inclined position. At this position, the hammock holding frame 239 has received the pivot pins 208 of the pivotal mounts 207 in the openings 249 in the attaching plates 242 of the side rods 238, and the engaging pins 244 of the front legs 201 are engaged with the first recesses 246 of the reclining members 241, so that the hammock holding frame 239 is held in the normal inclined position as supported by the pivot pins 208 and the engaging pins 244. In order to further recline the hammock holding frame 239 from this position, the operating pieces 250 pivotally supported on the backs of the side rods 238 are pulled up, whereby the reclining members 241 are pulled up at one of their respective ends through the wires 240 and turned against the springs 247, thereby destroying the engagement between the engaging pins 244 and the first engaging recesses 246. The hammock holding frame 239 is then rearwardly tilted and at a suitable position the hands are removed from the operating pieces 250, whereupon the reclining members 241 are turned in a counterclockwise direction as viewed in FIG. 9 under the forces of the springs 247, bringing the engaging pins 244 into engagement with the second engaging recesses 245, so that the hammock holding frame 239 is held in the more reclined position by the pivot pins 208 and the engaging pins 244.

In order to return the hammock holding frame and hence the back of the hammock to the normal inclined position, this can be achieved by the exact reverse of the operation described above. Thus, the reclining operation of the back of the hammock can be carried out by simply operating the operating pieces 250 which are within easy reach.

In this embodiment described above, a mechanism including wires is used to achieve the simultaneous actuation of a plurality of connecting links. In the following embodiment, a link mechanism including rods is used.

FIG. 12 is a perspective view showing the leg-opened state, with the mechanism related to the hammock omitted from the illustration. Referring to FIG. 12, the outline of the framework of the collapsible baby carriage will be described. Front legs 1 have front wheels 2 mounted at their lower ends while rear legs 3 have rear wheels 4 mounted at their lower ends. Push rods 5 have bent handles 6 provided at their upper ends. A pivotal mount 7 is fixed to each front leg 1 and pivotally supports each rear leg 3 and push rod 5 at a single pivot point. Front leg connecting links 9 are installed between the front legs 1 and interconnected by a front coupling 10 so that they are upwardly foldable in two. Rear leg connecting links 11 are installed between the rear legs 2 and interconnected by a rear coupling 12 so as to be upwardly foldable in two. Push rod connecting links 13 are installed between the push rods 5 and interconnected by an upper coupling 14 so as to be upwardly foldable in two. An operating grip 15 extending through the pivot points of the upper coupling 14 is adapted to be manually pulled up to upwardly fold the push rods connecting links 13 in two.

The operation will be outlined with reference to FIG. 12. When the push rod connecting links 13 are folded in two by pulling up the operating grip 15, the front leg connecting links 9 will be upwardly folded in two in interlocked relation thereto. This interlocking is achieved by first rods 16, which are substantially hidden in the front legs 1, as will be later described. When the front leg connecting links 9 are upwardly folded, as described above, second rods 17 push up a rear leg coupling 18 to reduce the angle between the front and rear legs 1 and 3. At the same time, the distances between the pair of push rods 5 and the front legs 1, respectively, are reduced. In interlocked relation of these actions, third rods 19 pivotally supported at one of their respective ends on the push rod side of the pivotal mounts 7 and at the other ends on the rear leg connecting links 11 guide the rear leg connecting links 11 so as to upwardly fold the latter. Thus, the front and rear leg connecting links 9 and 11 and the push rod connecting links 13 are upwardly folded into an elongated form. At the same time, the rear legs 1 approach the front legs 1. This state corresponds to the previously described state shown in FIG. 10.

Further, in this baby carriage, in the leg-opened state shown in FIG. 12, the push rods 5 can be tilted toward the front legs 1. This will now be described with reference to FIGS. 12 through 14. FIG. 13 is a partly omitted perspective view in the leg-opened state, illustrating the arrangement for selectively providing the back-fronting and face-fronting push modes, and FIG. 14 is a side view of the arrangement related to the pivotal mount 7.

Figure 14:
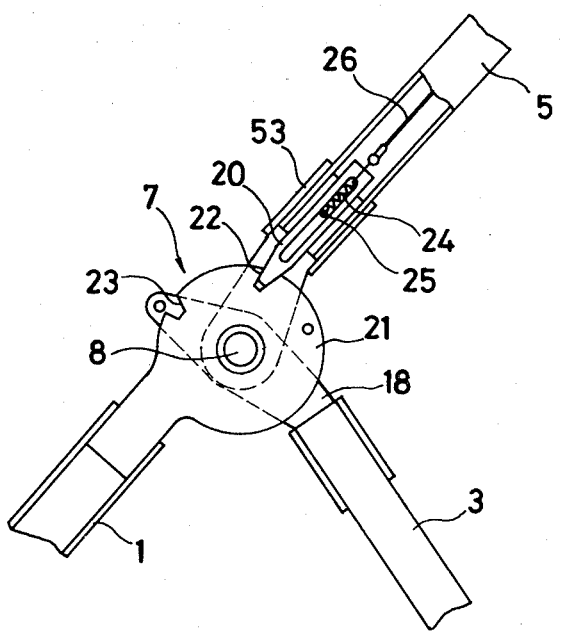
FIG. 14 is an enlarged side view illustrating the arrangement related to a pivotal mount shown in FIG. 12.

Referring to FIGS. 12 through 14, wedge-like members 20 are adapted to engage first notches 22 or second notches 23 formed in stop plates 21 included in the pivotal mounts 7. Springs 24 are installed between fixed pins 25 inside the push rods 5 and the upper ends of the wedge-like members 20 and downwardly urge the wedge-like members 20 to engage the notches 22 or 23. Wires 26 are tied at one of their respective ends to the wedge-like members 20 and at the other ends to operating pieces 27. The operating pieces 27 are pivotally supported on the backs of the push rods 5 and, when operated in the direction of arrow 28, pull up the wedge-like members 20 through the wires 26, disengaging the wedge-like members 20 and the first or second notches 22 or 23, so that the push rods 5 can be turned with respect to the front legs 1. Therefore, when the push rods 5 are forwardly turned and the operation of the operating pieces 27 is stopped, as in the case of FIG. 11, the wedge-like members 20 engage the second notches 23, thereby providing the face-fronting push mode.

Figure 15:
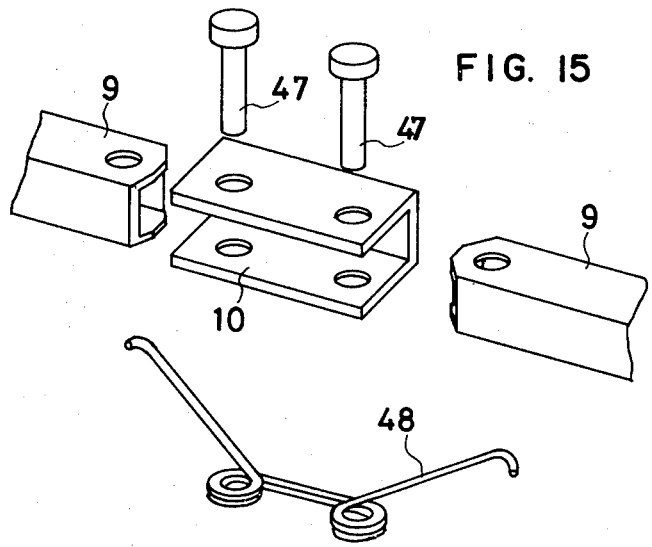
FIG. 15 is an enlarged exploded perspective view for showing how, e.g., the front leg connecting links in FIG. 12 are connected together by a front coupling.

FIG. 15 is an exploded perspective view for explaining how, e.g., the front leg connecting links are connected by the front coupling 10. The front legs 9 and the front collecting coupling 10 are pivotally connected by pins 47. A spring 48 is fitted on the pins 47, with the ends of said spring abutting against the inner surfaces of the front leg connecting links 9. Therefore, the front leg connecting links 9 are maintained straight. In addition, such arrangement is also applied to the connection between the rear leg connecting links 11 and rear coupling 12 and to the connection between the push rod connecting links 13 and upper coupling 14.

Figure 16:
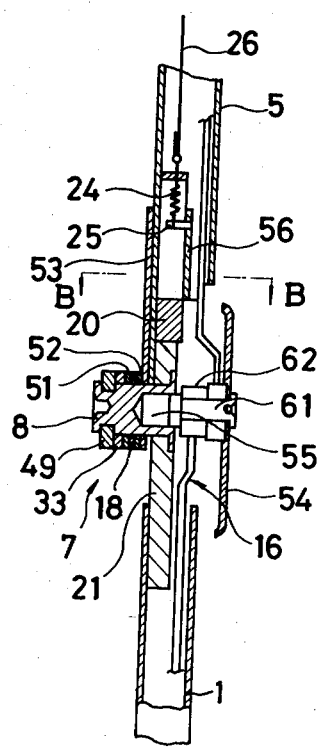
FIG. 16 is a longitudinal section, which corresponds to FIG. 7, illustrating the arrangement around the pivotal mount of FIG. 12.
Figure 17:
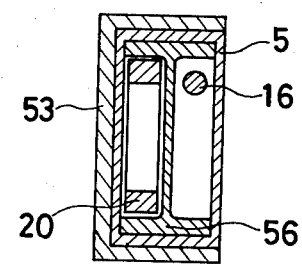
FIG. 17 is an enlarged section taken along the line B—B of FIG. 16.
Figure 18:
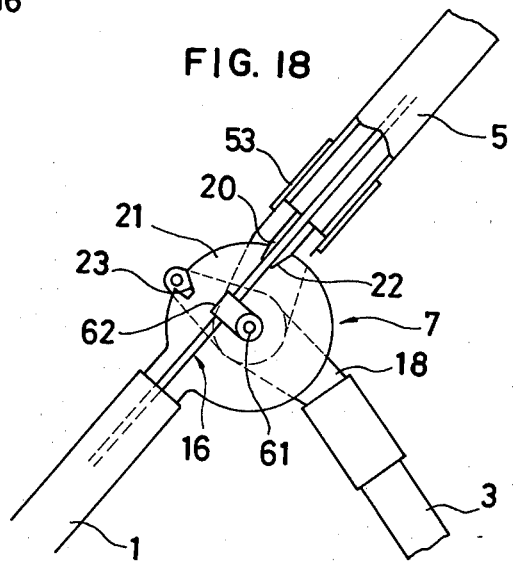
FIG. 18 is an enlarged side view, partly broken away, showing the arrangement around the pivotal mount of FIG. 12, for showing the disposition of a first rod.
Figure 21:
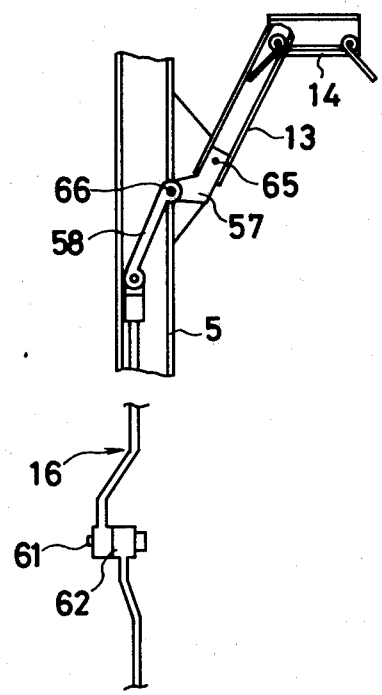
FIG. 21 is a longitudinal section, partly broken away, showing a state different from that shown in FIG. 20.

The arrangement serving for the collapsing operation will be described in detail. FIG. 16 is a longitudinal section showing the arrangement in the vicinity of the pivotal mount, and FIG. 17 is a section taken along the line B—B of FIG. 16. FIG. 18 is a side view, partly broken away, showing the arrangement in the vicinity of the pivotal mount. FIG. 19 is a side view, partly broken away, showing a state different from the one shown in FIG. 18. FIG. 20 is a longitudinal section showing an interlocking mechanism extending from a push rod connecting link to a front leg connecting link, and FIG. 21 is a longitudinal section showing a state different from the one shown in FIG. 20.

Before describing the arrangement related to the collapsing operation, the positional relation of the elements described so far will be described. Fitted on the pivot pin 8 are a washer 49, a holder frame pivotal mount 33 (corresponding to, e.g., the projection 242b in FIG. 7) for pivotally supporting the hammock holding frame, a spacer 51, a rear leg coupling 18, a spacer 53, and a stop plate 21. Further, a pin 55 for holding a cover 54 is fitted in the pivot pin 8. Each wedge-like member 20 is adapted to slide along a guide 56, said fixed pin 25 projecting from said guide 56.

Referring to FIGS. 16 through 21, the arrangement related to the collapsing operation will be described. A lever 57 is disposed outwardly of a point 65 at which the push rod connecting rod 13 is pivotally connected to the push rod 5, so that the lever 57 can be turned integrally with the push rod connecting rod 13. The lever 57 has a shape upwardly bent with respect to the push rod connecting link 13. One end of a connecting bar 58 is pivotally connected to the front end of the lever 57 at a pivot point 66, while the other end of said connecting bar 58 is pivotally connected to the first rod 16. The first rod 16 extends through the tubular push rod 5 and bent adjacent the stop plate 21 to clear the latter. The first rod 16 is then inserted in the tubular front leg 1, the lower end thereof being pivotally connected to one end of a connecting bar 59. The other end of the connecting bar 59 is pivotally connected to the front end of a lever 60 at a pivot point 67. The lever 60 has a shape similar to the lever 57 and is disposed at the end of the front leg connecting link 9 so that it is turned integrally with the front leg connecting link 9 around a pivot point 68 with respect to the front leg 1. In addition, a foldable section 62 pivotally supported by a pin 61 and opposed to the stop plate 21 is formed intermediate between the ends of the first rod 16.

FIGS. 18 and 19 show the push rods 5 achieving the back-facing and face-to-face pushing modes, respectively, as described above. In order to achieve these two pushing modes, it is necessary to change the angle between the front legs 1 and the push rods 5. To this end, it is necessary for the first rod 16 to have the foldable section 62, and in the case of, e.g., FIG. 19, it will be understood that the first rod 16 is made foldable by the folding section 62 so as not to interfere with the rotation of the push rod 5. Further, in the state shown in FIG. 18, the first rod 16 is held straight, so that the thrust is advantageously transmitted. Therefore, when the push rod connecting link 13 is turned so as to switch the state shown in FIG. 20 to the one shown in FIG. 21, the lever 57, connecting bar 58, first rod 16, connecting bar 59 and lever 60 are actuated as desired, upwardly folding the front leg connecting link 9.

The levers 57, connecting bars 58, first rods 16, connecting bars 59 and levers 60 are actuated as desired in operative association with the above described upward folding movement of the push rod connecting links 13, so that the front leg connecting links 9 are also upwardly folded. At this time, the positional relation of the pivot points 65 and 66, 67 and 68 functions to advantageously guide the connecting bars 58 and 59 in the interiors of the push rods 5 and front legs 1 which are limited spaces. This will now be described with reference to FIGS. 22 through 24.

Figure 22:
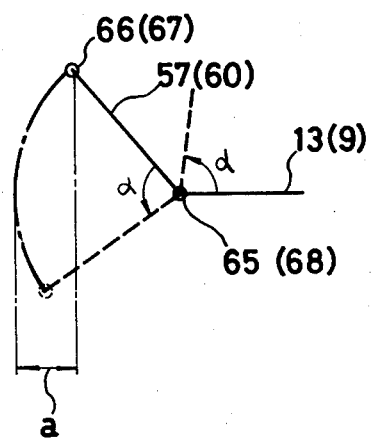
FIG. 22 is a diagrammatic view, showing the positional relation of a pivot point formed in the vicinity of a joint between a connecting link and a first rod.
Figure 23:
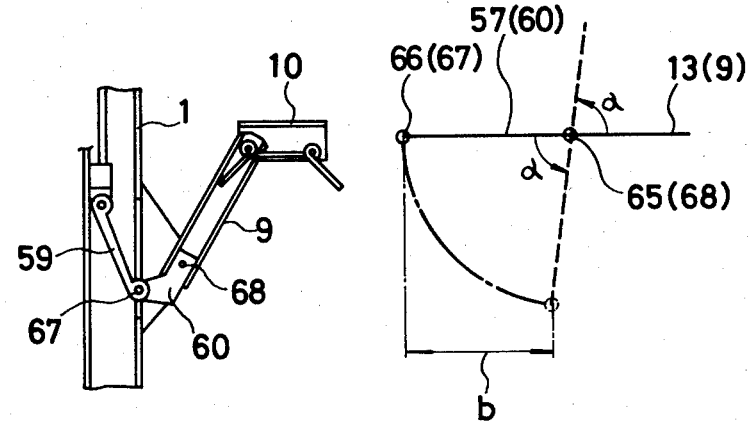
FIG. 23 is a diagrammatic view, which corresponds to FIG. 22, showing the positional relation of a pivot point of the prior art.
Figure 24:
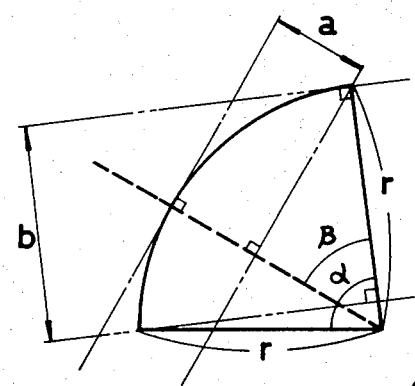
FIG. 24 has been drawn for the purpose of proving that the arrangement shown in FIG. 22 is more advantageous than the one shown in FIG. 23.

FIG. 22 is a diagrammatic view, showing the positional relation of the pivot points 65 and 66 or 68 and 67 shown in FIGS. 20 and 21, and FIG. 23 is a diagrammatic view, which corresponds to FIG. 22, showing the positional relation used in a common prior art. FIG. 24 is a diagrammatic view which proves the advantage of this embodiment. In addition, in FIG. 22, the parts are corresponding to those shown in FIGS. 20 and 21 are designated by like reference numerals, and in FIG. 23, the parts corresponding to those shown in FIG. 22 are designated by the same reference numerals used in FIG. 22.

Referring to FIG. 22, the pivot point 66 provided on the end of the lever 57 or 60 upwardly extending from the pivot point 65 or 68 of the connecting link 13 or 9 will, when the connecting link 13 or 9 is turned an angle $\alpha$, be turned the same angle $\alpha$, describing an arc. The extent of movement of the pivot point 66 or 67 in a horizontal direction is indicated at a.

On the other hand, referring to FIG. 23, when the connecting link 13 or 9 and the lever 57 or 60 are formed straight, as can be usually considered, the extent of movement in a horizontal direction of the pivot point 66 or 67 which is displaced in accordance with turning of the connecting link 13 or 9 through the angle $\alpha$ is indicated at b.

Since the movement of the pivot point 66 or 67 demonstrated by the two typical examples given above is performed in the limited space inside the tubular link member 5 or 1, it will be understood that the shorter the extent of movement in a horizontal direction, the more advantageous. Thus, the advantage of the invention can be shown by proving that the length a is shorter than the length b.

This will now be shown by reference to FIG. 24. In FIG. 24, let r be the distance from the pivot point 65 or 68 to the pivot point 66 or 67. With the r as a radius, a sector with a central angle $\alpha$ is drawn, with lengths a and b also indicated. The length a corresponds to the distance between a tangent at one end of an arc with a smaller central angle β than the central angle α and a perpendicular drawn to the radius at said one end from the intersection between the arc and the radius at the other end of said arc. The length b corresponds to the distance between a tangent drawn to one end of the arc with the central angle α and a perpendicular drawn from the intersection between the radius at the other end and the arc to the radius at said one end. Further, the central angle α is smaller than 90°. Therefore, $$a = r - r \cos \beta$$
$$b = r - r \cos \alpha$$
$$b - a = -r \cos \alpha + r \cos \beta$$
$$= r (\cos \beta - \cos \alpha) > 0 \; (\because \beta < \alpha < 90°)$$

Thus, it has been proved that the length a is shorter than the length b. This is so because the pivot point 66 or 67 is present at a position displaced from a line joining the pivot point 65 or 68 and the other pivot point of the connecting link 13 or 9 in a direction of rotation opposite to the direction of rotation of the connecting link 13 or 9.

The opening and closing operations of this collapsible baby carriage will now be described.

For example, in the leg-opened state shown in FIG. 12, the front leg onnecting links 9, rear leg connecting links 11, and push rod connecting links 13 are held straight between the front legs 1, rear legs 3 and push rods 5, respectively. Further, as shown in FIG. 13, 14 or 18, the wedge-like members 20 are engaged with the first notches 22 of the stop plates 21, so that the push rods 5 are in the back-fronting push state. Further, the rear leg connecting links 11 are in the state of being opened with respect to the front legs 1 under their own weight, the upper limit of the opening being defined by the second rods 17.

When it is desired to close the legs of the baby carriage from this leg-opened state, this may be achieved by gripping the operating grip 15 and raising it, whereby the push rod connecting links 13 are upwardly folded in two, this movement being transmitted through the first rods 16, etc. so as to upwardly fold the front leg connecting links 9. In response thereto, the second rods 17 act to bring the rear legs 3 closer to the front legs 1 and at the same time, the third rods 19 act to upwardly fold the rear leg connecting links 11. Therefore, eventually, the front and rear legs 1 and 3, and the push rods 5 respectively approach each other, thereby establishing an elongated collapsed state. This state corresponds to what is shown in FIG. 10 described above.

In order to switch the leg-closed state to the leg-opened state, the operating grip 15 may be gripped and depressed. At this time, the rear coupling may be stepped on by the foot to assist in the leg opening operation.

Figure 25:
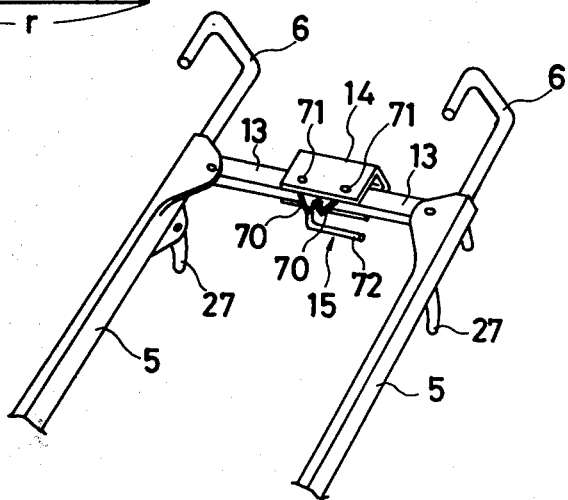
FIG. 25 is a fragmentary perspective view of another embodiment of the invention which is obtained by suitably modifying the embodiment shown in FIG. 22.
Figure 26:
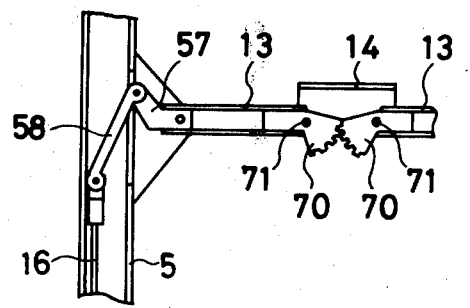
FIG. 26 is a longitudinal section, showing an interlocking mechanism between a push rod connecting link and a push rod in the embodiment shown in FIG. 25.
Figure 27:
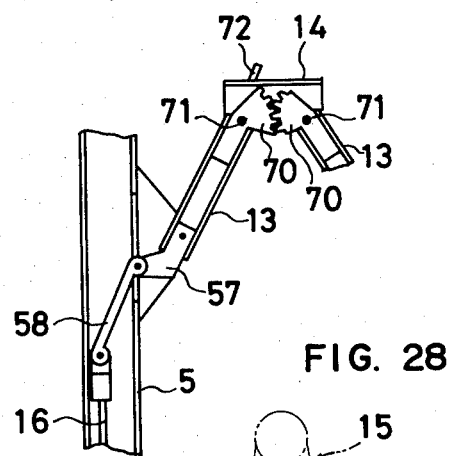
FIG. 27 is a longitudinal section, showing a state different from that shown in FIG. 26.

FIGS. 25 through 27 show a further embodiment of the invention. FIG. 25 is a partly omitted perspective view showing the leg-opened state; FIG. 26 is a longitudinal section showing the coupled state of push rod connecting links coupled by an upper coupling; and FIG. 27 is a longitudinal section showing a state different from the one shown in FIG. 26, i.e., a leg-closed state. In addition, in FIGS. 25 through 27, the parts corresponding to those shown in FIGS. 12, 20 and 21 are given the same reference numerals. This embodiment is an improvement on the preceding one, assuring a smoother collapsing operation.

The ends of the push rod connecting links 13 interconnected by the upper coupling 14 are provided with gears 70. Each gear 70 is in the form of a sector which is peripherally formed with teeth, having a necessary minimum shape to achieve an operation to be presently described, said shape contributing to rendering this part compact. The gear 70 is fixedly installed by being fitted in the associated push rod connecting link 13, and is pivotally connected to the upper coupling 14 by a shaft 71 extending transversely therethrough. One of the two shafts 71 is fixed to the associated gear 70 so that it can be turned integrally with the latter, said one shaft 71 projecting through the upper coupling 14 to appear at one side thereof, where an operating handle 15 is formed. The operating handle 15 includes a lever portion 72 extending at right angles with the axis of the shaft 71.

In such arrangement, the bending, i.e., upward folding of the push rod connecting links 13 is achieved in a state where the gears 70 are held meshing with each other. More specifically, with the gears 70 meshing with each other all the way from the state shown in FIG. 26 to the state shown in FIG. 27, the push rod connecting links 13 are upwardly folded in two.

According to the collapsible baby carriage, in order to change such leg-opened state to the leg-closed state, the lever portion 72 of the operating handle 15 is manually gripped and raised to allow the baby carriage to hang downwardly, whereupon the weight of the baby carriage acts to produce a force which positively turns one gear 70 in a counterclockwise direction as viewed in the illustration, so that the other gear 70 meshing therewith is forced to turn clockwise. This movement acts to upwardly fold the push rod connecting links 13, forcing the latter into the state shown in FIG. 27. Therefore, as a result of the same movement as in the preceding embodiment, the leg-closed state is established.

Further, when it is desired to make a change from the leg-closed state to the leg-opened state, this may be achieved by manually turning the lever portion 72 clockwise as viewed in the illustration, i.e., counterclockwise as viewed from the operating side, whereby with the gears 70 meshing with each other the push rod connecting links 13 are actuated to come into line, so that, as in the preceding case, the link mechanism including the first rods 16 brings the baby carriage into the leg-opened state.

According to this embodiment, the turning of the operating handle 15 controls the turning of one of the gears 70 meshing with each other, said gears 70 being interlocked with the push rod connecting links 13 so that the latter are symmetrically bent. Therefore, by manually turning the operating handle 15 by gripping the lever portion 72, it is possible to smoothly effect the opening and closing of the baby carriage. Further, since the push rod connecting links 13 are arranged so that they can be upwardly bent, the raising of the lever portion 72 extending at right angles with the axis of the shaft 71 of one gear 70 so as to hang the baby carriage downwardly causes the weight of the baby carriage to act to immediately bring the baby carriage into the leg-closed state.

The above embodiment has been arranged so that the leg closing operation on the baby carriage can be immediately performed. If, however, an arrangement is employed which causes the downward bending of the push rod connecting links 13, it is possible to arrange the baby carriage so that the leg opening operation can be immediately performed. This may be said of all the embodiments disclosed herein.

Further, in this embodiment, the interlocking mechanism using gears 70 is applied to the push rod connecting links 13 alone, but such mechanism may also be applied to the front leg connecting links 9 and rear leg connecting links 11 shown in FIG. 12. Since such arrangement makes the bending movement of two connecting links symmetrical, it will make the opening and closing operations of the baby carriage smoother.

Figure 30:
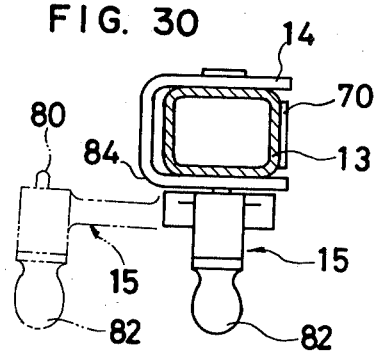
FIG. 30 is a section taken along the line D—D of FIG. 28 or 29.
Figure 28:
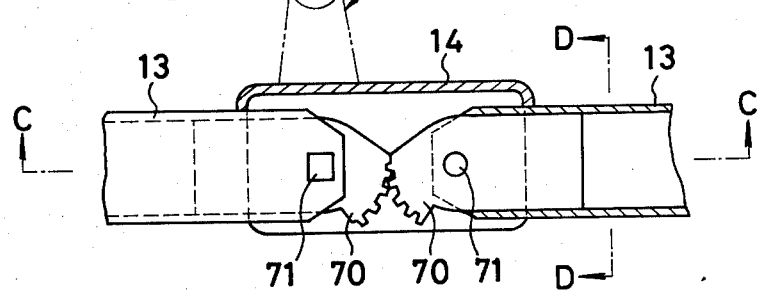
FIG. 28 is a longitudinal section of another embodiment of the invention which is obtained by suitably modifying the embodiment shown in FIG. 25.
Figure 29:
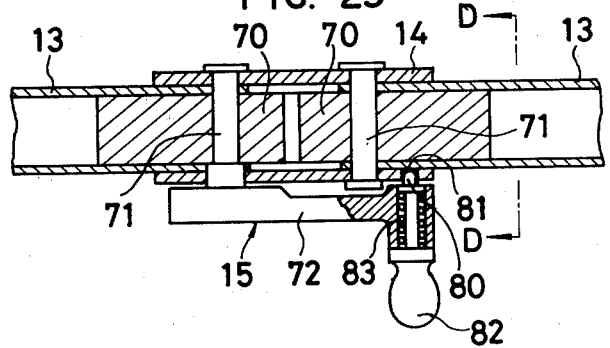
FIG. 29 is a section taken along the line C—C of FIG. 28.

FIGS. 28 through 30 illustrate a further embodiment of the invention. FIG. 28 is a front view, partly in section, showing the principal portion; FIG. 29 is a section taken along the line C—C of FIG. 28; and FIG. 30 is a section taken along the line D—D of FIG. 28 or 29. The embodiment shown therein is a modification of the embodiment described with reference to FIGS. 25 through 27. The same parts are designated by the same reference numerals and only the arrangement different therefrom will be described below.

The characteristic feature of this embodiment is that it has the function of maintaining the linear state of the push rod connecting links 13. More specifically, the shaft 71 of one gear 70 is rectangular in cross-section so as to be fixedly secured to the gear 70. The end of the lever portion 72 of an operating handle 15 integrally extending from said shaft 71 is provided with a projection 80, while an upper coupling 14 is provided with a hole 81 for receiving said projection 80. The projection 80 is integral with a grip 82 and is permanently urged to project by a coil spring 83. If, therefore, the grip 82 is pulled, the projection 80 is pulled out of the hole 81 against the resilient force of the coil spring 83, so that the engagement between the projection 80 and the hole 81 is destroyed. Further, if the grip 82 is not pulled, the projection 80 is kept projected by the resilient force of the coil spring 83, so that the engagement between the projection 80 and the hole 81 is maintained.

With this arrangement, since the lever portion 72 adapted to be rotated integrally with one gear 70 is fixed with respect to the upper coupling 14, the other gear 70 meshing with said one gear 70 is also fixed with respect to the upper coupling 14, so that the push rod connecting links 13 are prohibited from being turned with respect to each other and hence the linear state of the push rod connecting links 13 is maintained.

If it is desired to bend the push rod connecting links 13, this may be achieved by pulling the grip 82 to destroy the engagement between the projection 80 and the hole 81, then raising the grip 82 to allow the baby carriage to hang downwardly. Reversely, if it is desired to change the bent state to the linear state, this may be achieved by turning the lever portion 72 in a clockwise direction as viewed in FIG. 28 by gripping the grip 82. At this time, as shown in FIG. 30, the projection 80 abuts against the rounded corner 84 of the upper coupling 14. Since the projection 80 is retracted by the corner 84 as it is guided by the latter, there is no need to intentionally pull the grip 82 to retract the projection 80. The projection 80 will automatically engage the hole 81 whenever it comes to the position of the hole 81.

According to this embodiment, the linear state of the push rod connecting links 13 is maintained by simple means, so that there is no possibility of the baby carriage being accidentally closed. Therefore, this embodiment has the advantage of providing higher safety. In this connection, it is to be pointed out that this lock mechanism is not always necessary. That is, when a baby is placed in the baby carriage, the weight thereof holds the leg-opened state, making it impossible to raise the operating handle 15, so that there will be almost no danger of accidental closing.

Figure 31:
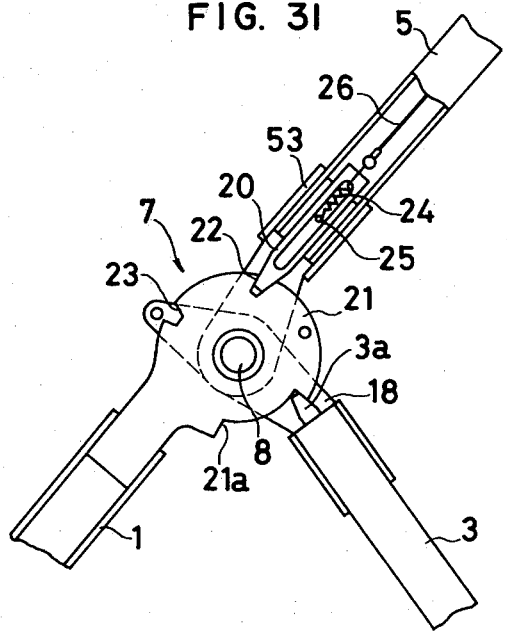
FIG. 31 is an enlarged side view of another embodiment of the invention which is obtained by suitably modifying the embodiment shown in FIG. 12, illustrating the relation between a pivotal mount and a rear leg.

FIG. 31 is a view for explaining another embodiment of the invention, illustrating parts corresponding to those shown in FIG. 14. This embodiment is improved in the following respect.

In the embodiments described so far with reference to FIG. 12 et seq., the rear legs 3 are held fully opened with respect to the front legs 1 by the second rods 17 serving as props. Besides such arrangement, this embodiment has an arrangement for fixing the opened state of the rear legs 3 more firmly. Thus, each rear leg 3 is provided with a locking projection 3a directed toward the stop plate 21, while the stop plate 21 is provided with a notch 21a having a desired angular extent. Therefore, as the rear leg 3 is turned, the locking projection 30 is displaced within the notch 21a, the extent of turning of the rear leg 3 being defined by the locking projection 3a abutting against the opposite lateral walls of the notch 21a.

Figure 32:
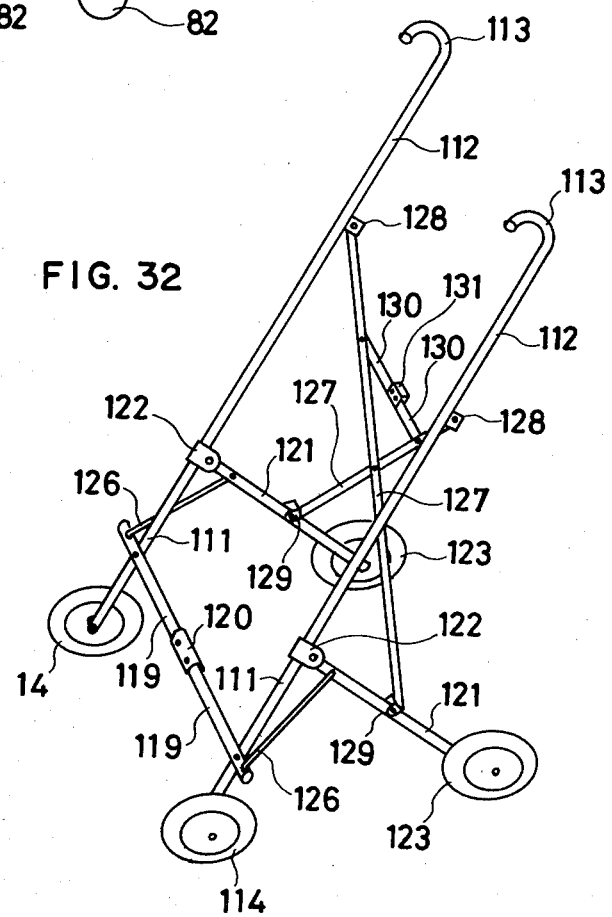
FIG. 32 is a perspective view of a further embodiment of the invention shown in its leg-opened state.
Figure 33:
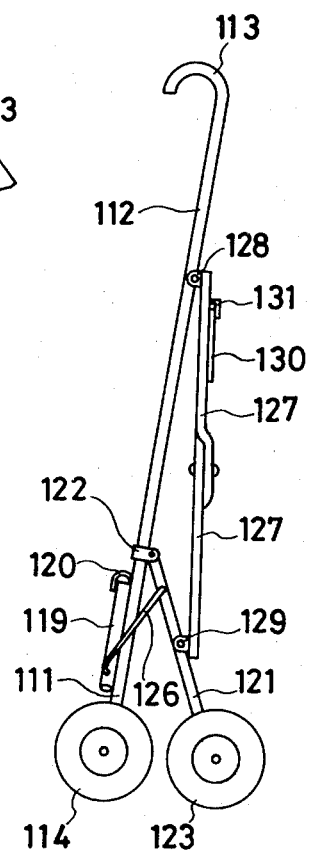
FIG. 33 is a side view of the baby carriage of FIG. 32 shown in its leg-closed state.

FIGS. 32 and 33 are views for explanation of another embodiment of the invention. FIG. 32 is a perspective view showing the framework in the leg-opened state, and FIG. 33 is a side view showing the framework in the leg-closed state. In addition, this embodiment shows that the present invention is also applicable to a baby carriage construction of which is basically different from that of the baby carriage to which the preceding embodiments have been applied.

A collapsible baby carriage shown in FIGS. 32 and 33 comprises front legs 111, from which push rods 112 integrally extend, the front ends thereof being curved to form handles 113. Front wheels 114 are rotatably mounted at the front ends of the front legs 111. The push rods 112 have a hammock mounted thereon, but the hammock is not shown. Front leg connecting links 119 are pivotally connected at one of their respective ends to the front legs 111 and at the other ends thereof to each other through a front coupling 120 so as to be upwardly foldable in two. Rear legs 121 are pivotally connected at one of their respective ends to the push rods 112 through fittings 122 and have rear wheels 123 rotatably mounted at the other ends thereof. Connecting bars 126 pivotally connected at one of their respective ends are pivotally connected at the other ends thereof to the front leg connecting links 119 outwardly of the points at which the front leg connecting links 119 are pivotally connected to the front legs 111. Cross connecting links 127 pivotally connected together crosswise are pivotally connected at one of their respective ends to the push rods 112 through fittings 128 and at the other ends to the rear legs 121 through fittings 129. Rear leg connecting links 130 are pivotally connected at one of their respective ends to the cross connecting links 127 and at the other ends to each other through a rear coupling 131 so as to be upwardly foldable.

In the collapsible baby carriage of this type, the arrangement related to the push rod connecting links 13 and upper coupling 14 in the various embodiments described above is applied to the rear leg connecting links 130 and rear coupling 131, though not shown.

The collapsing operation of this collapsible baby carriage will be described. In the leg-opened state shown in FIG. 32, the front leg connecting links 119 and rear leg connecting links 130 are positioned straight, the front legs 111, i.e. the push rods 112, and the rear legs 121 are spaced farthest, and the rear legs 121 form the largest angle with the front legs 111. When it is desired to close the baby carriage from this state, the rear leg connecting links 130 are operated to be upwardly bent. This may be effected by raising an operating handle (not shown) extending rearwardly of the rear coupling 131 to allow the baby carriage to hang downwardly. As a result, the cross connecting links 127 are turned with respect to each other, bringing the push rod 121 closer to each other, and the rear legs 212 closer to each other, while the rear legs 121 are downwardly turned to reduce the angle which they form with the front legs 111. As a result, the connecting bars 126 with one of their respective ends pivotally connected to the rear legs 121 are depressed, thereby thrusting down the outer sides of the front leg connecting links 119, bending the front leg connecting links 119 upwardly. Thus, the link mechanism brings about a series of such actions until the closed state shown in FIG. 33 is established.

As described above, the present invention is applicable to a baby carriage of the type in which connecting links (rear connecting links 130) for collapsing operation are pivotally connected at their opposite ends to bendable connecting links (cross connecting links) pivotally connected to a pair of push rods 112.

Further, as a modification of the embodiment shown in FIGS. 32 and 33, the invention is also applicable to a collapsible baby carriage of the type in which the cross connecting links 127 are pivotally connected at their opposite ends to the push rods 112 and in order to permit the collapsing operation, the cross connecting links 127 are slidably connected at one of their respective ends to the push rods 112.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A collapsible baby carriage comprising a pair of parallel front legs (1) with respective wheels, a pair of parallel rear legs (3) with respective wheels, and a pair of parallel push rods (5) with respective handles, two pivot means (7), each pivot means operatively connecting one front leg, one rear leg, and one push rod, first hingeable link means (9, 10) operatively interconnecting said parallel front legs (1), second hingeable link means (13, 14) operatively interconnecting said parallel push rods (5), said first and second hingeable link means (9, 10; 13, 14) being hingeable substantially upwardly, first operating means (16) extending substantially in parallel to at least one of said push rods and to at least the respective one of the front legs, lever means (57, 58, 59, 60) operatively interconnecting said first operating rod means (16) to said first and second hingeable link means (9, 10, 13, 14) whereby operating one of said first and second link means simultaneously causes the operation of the other of said first and second link means, and second operating means (17) operatively interconnecting said first hingeable link means (9, 10) and said parallel rear legs (3) whereby operating of said first hingeable link means is operatively associated with the closing and opening of an angle of intersection between said rear legs (3) and said front legs (1).

2. The collapsible baby carriage of claim 1, further comprising third hingeable link means (11, 12) operatively interconnecting said rear legs (3), and third operating means (19) operatively interconnecting said third hingeable link means (11, 12) and said parallel front legs whereby said closing and opening of said angle of intersection operates said third hingeable link means (11, 12).

3. The collapsible baby carriage of claim 2, wherein said first, second, and third operating means are rod means.

4. The collapsible baby carriage of claim 1, wherein said pivot means (7) comprise a pair of pivot shafts for pivotally mounting said front legs and said rear legs thereon.

5. The collapsible baby carriage of claim 4, wherein said pair of pivot shafts also mount said parallal push rods (5).

6. The collapsible baby carriage as set forth in claim 5, wherein said first rods are arranged to pass by said pivot points along said push rods and said front legs,
said first rods each include a first portion and a second portion and a coupling portion which bendably couples said first and second portions,
said coupling portion being positioned in the vicinity of said pivot points.

7. The collapsible baby carriage of claim 1, wherein said two pivot means comprise pivotal mounts operatively secured to said parallel front legs, said pivotal mounts having pivot shafts formed thereon.

8. The collapsible baby carriage as set forth in claim 7, wherein said pivotal mounts each include a fixed stop plate having a circumferential surface with its center axis at said associated pivot shaft,
said circumferential surface of each said stop plate being formed with at least two notches at different positions thereon,
each of said push rods is provided with a wedge-like member movable toward and away from said associated stop plate, whereby
the selective engagement of said movable wedge-like members with the first or second notches on said stop plates enables said push rods to be fixed in two states, one in which they are tilted forwardly and the other in which they are tilted rearwardly.

9. The collapsible baby carriage as set forth in claim 8, further comprising a sping member whose one end is fixed to each of said wedge-like members, whereby
said wedge-like members are urged toward said stop plates by said spring members.

10. The collapsible baby carriage as set forth in claim 9, including wires connected at one of their respective ends to said wedge-like members, and
operating means for pulling said wires, whereby pulling said wires by said operating means enables said wedge-like members to be disengaged from said notches against the resilient forces of said spring members.

* * * * *